United States Patent [19]

Deibig et al.

[11] 4,447,477

[45] May 8, 1984

[54] METHOD FOR THE PRODUCTION OF CORROSION-INHIBITING COATINGS ON METALLIC SURFACES

[75] Inventors: Heinrich Deibig, Frankfurt am Main; Klaus Wollmann, Limburg, both of Fed. Rep. of Germany

[73] Assignee: Battelle-Institut e.V., Frankfurt am Main, Fed. Rep. of Germany

[21] Appl. No.: 459,693

[22] PCT Filed: Jun. 24, 1982

[86] PCT No.: PCT/EP82/00131

§ 371 Date: Dec. 29, 1982

§ 102(e) Date: Dec. 29, 1982

[87] PCT Pub. No.: WO83/00105

PCT Pub. Date: Jan. 20, 1983

[30] Foreign Application Priority Data

Jun. 26, 1981 [DE] Fed. Rep. of Germany ....... 3125113

[51] Int. Cl.$^3$ ............................................... B05D 3/02
[52] U.S. Cl. ............................. 427/388.3; 148/6.15 R; 427/27; 427/409; 106/14.15; 106/14.24; 252/390; 252/393
[58] Field of Search ............... 106/14.24, 14.42, 14.15; 148/6.15 R; 427/388.3, 409, 399, 27; 252/390, 393

[56] References Cited

U.S. PATENT DOCUMENTS

| | | | |
|---|---|---|---|
| 2,223,327 | 11/1940 | Light et al. | 427/388.3 X |
| 2,573,882 | 11/1951 | Waters | 106/14.24 X |
| 2,615,815 | 10/1952 | Galvin et al. | 106/14.24 X |
| 2,927,089 | 3/1960 | Copthorne | 524/6 |
| 4,100,315 | 7/1978 | Lauterbach | 427/388.3 X |
| 4,165,242 | 8/1979 | Kelly et al. | 148/6.15 Z |
| 4,212,674 | 7/1980 | Strauch | 106/14.05 |
| 4,272,416 | 6/1981 | Passalenti et al. | 106/14.24 X |

*Primary Examiner*—Thurman K. Page
*Attorney, Agent, or Firm*—Fisher, Christen & Sabol

[57] ABSTRACT

In a method for the production of corrosion-inhibiting coatings on metallic surfaces, a mixture consisting of a phenol, low molecular condensation products of formaldehyde and ammonia or amines and a wetting agent, which is chemically reactive with the starting materials, is applied onto the surface to be coated and is cured under heat. The mixture is applied in the form of a solution, dispersion or powder.

4 Claims, No Drawings

METHOD FOR THE PRODUCTION OF CORROSION-INHIBITING COATINGS ON METALLIC SURFACES

BACKGROUND OF THE INVENTION

1. Field of the Invention

The invention relates to a method for the production of corrosion-inhibiting coatings on metallic surfaces, according to which monomeric phenols and low molecular condensation products of formaldehyde and ammonia or amines are applied onto the pretreated surface and cured under heat.

2. Prior Art

According to conventional methods, metalic surfaces are coated with finished polymers by lacquering, immersing, spraying, powder application and the like. With phenol/formaldehyde condensation products, however, only relatively thick and porous coatings can be produced by these methods.

It is known from German Pat. No. 27 12 903 that thin anticorrosive coatings consisting of condensation products of phenols with low molecular condensation products of formaldehyde with ammonia or amines can be produced on metallic surfaces by evaporation. Thereby a very homogeneous distribution of the individual components on metallic surfaces can be obtained. This, during the curing step, results in non-porous coatings. However, the major drawbacks of this method are that considerable resources pertaining to the apparatus are necessary and that coatings can only be produced on surfaces which can readily be cooled.

BROAD DESCRIPTION OF THE INVENTION

The object of the present invention is to overcome the above stated disadvantages of the prior art and to develop a method for the production of thin and non-porous coatings on the basis of phenol/formaldehyde condensation products on metallic surfaces.

According to the invention a solution, a dispersion or a powder of a mixture of starting materials is applied onto the surface to be coated together with a wetting agent which is chemically reactive with at least one of the starting materials.

Preferably fatty amines, fatty acid amides, fatty acid alkanolamides, condensated amines, polyamines or protein ampholytes are used as the wetting agents. Preferably the amount of the phenolic component in the mixture is 50 to 96 weight percent. Preferably the amount of the wetting agent in the mixture is from 0.01 to 10 weight percent. Also, preferably bisphenol A is used as the phenolic component and hexamethylenetetramine is used as formaldehyde condensation product. The ratio of bisphenol A to hexamethylenetetramine in the mixture is preferably 4:1.

According to the present invention the phenolic component of the monomeric mixture may consist of substituted or nonsubstituted phenols, for example, phenol, bisphenol A, m-cresole, 3,5-dimethylphenol, m-chlorophenol, salicylic aldehyde, m-isopropenylphenol, resorcinol and 4,4'-diphenylol. The phenolic component may be an individual phenol comouond or a mixture of phenols. Preferably biphenol A is used.

Suitable condensation products of formaledehyde and amines are, for example, hexamethylenetetramine, bis(dimethylamino)-methane, a condensation product from 1 mole of phenol, 3 moles of formaldehyde and 3 moles of dimethylamine (2,4,6-tris-dimethylaminophenol), and the like and mixtures thereof. Hexamethylenetetramine is preferably used.

The mixing ratio of the phenolic component to the formaldehyde condensation product may vary widely. Mixtures containing 50 to 95 weight percent of the phenolic component are preferred.

In order to achieve the best possible homogeneous mixture of powdery starting materials, the powder mixture can be fused prior to its application and then can be pulverized again.

Homogeneous distribution of the phenolic compounds and the formaldehyde condensation products on the metallic surface to be coated is achieved according to the invention by using a wetting agent. However, conventional wetting agents substantially reduce the adhesion of the protective coatings on the metallic surface. Very good adhesion is achieved only by tensides acting as wetting agents. In addition such wetting agents cause homogeneous distribution of the individual components on the metallic substrate. Suitable wetting agents are in particular fatty amines, fatty acid amides, fatty acid alkanolamides, condensated amines, polyamines, proteinampholytes and the like as well as products containing hydroxyl groups. Such surface active compounds react with one or both of the starting materials. The wetting agents are added to the mixture of the phenol/formaldehyde condensation product in an amount of 0.01 to 10 weight percent. Curing of the total mixture, which is applied to the metallic surface in the form of a solution, a dispersion or a powder, is achieved by heating to a temperature of 100° to 250° C., preferably to a temperature between 150° and 200° C.

DETAILED DESCRIPTION OF THE INVENTION

The method according to the invention is further described in the following examples:

EXAMPLE 1

A mixture of 10 parts by weight of bisphenol A and 1.5 parts by weight of hexamethylenetetramine and 0.5 parts by weight of a fatty amine is dissolved in a solution consisting of 80 parts of volume of ethanol and 20 parts by volume of 3% ammonia solution. A desgreased and phosphatized iron plate is immersed into this solution, and then dried for 5 minutes at a temperature of 80° C. Finally it is heated at 180° C. for one hour. The coating produced has the following characteristics:
Thickness: 60 μm
Pencil hardness: 1 to 2
Square-cut adhesion (DIN 53161): Gt 0 to Gt 1,
Mandrel bending strength (DIN 53151, 10 mm mandrel): +
Porosity (DIN 53161): P1 to P2.

EXAMPLE 2

A degreased and phosphatized iron tube is heated to a temperature of 160° C. and immersed into a finely powdered mixture of 100 parts by weight of bisphenol A, 20 parts by weight of hexamethylenetetramine and 3 parts by weight of a fatty acid amide. The powdered layer is then cured by heating to a temperature of 170° C. for one hour to give a smooth, firmly adhering layer which has the following characteristics:
Thickness: 50 μm,
Pencil hardness: 1 to 2,
Square-cut adhesion (DIN 53181: Gt 0 to Gt 1), Porosity (DIN 53161): P1 to P2.

After three months of boiling the coating in sea water, the coating exhibits no corrosion.

EXAMPLE 3

50 g of bisphenol A and 5 g of hexamethylenetetramine are fused at 130° C.; after cooling, the fused material is ground and sieved to a grain diameter of less than 100 μm.

A degreased iron plate is immersed in a 1% solution of an amine-terminated liquid caoutchouc (Hycar ATBN) and, upon drying, electrically coated with the pulverized and sieved mixture.

It is then cured for 15 minutes at 150° to 200° C. (increasing temperature) and results in a firmly adhering smooth layer with the following characteristics.

Thickness: 30 μm,
Pencil hardness: 1 to 2,
Square-cut adhesion (DIN 53191): Gt 0 to Gt 1,
Porosity (DIN 53161): P1.

We claim:

1. Method for the production of corrosion inhibiting coating or pretreated metallic surfaces comprising applying a mixture of (i) 50 to 95 weight percent, based upon the total weight of the mixture, of a monomeric phenol, (ii) a low molecular condensation product of formaldehyde together with ammonia or an amine, and (iii) 0.1 to 10 weight percent, based upon the total weight of the mixture, of a wetting agent, which is chemical reactive with at least one of materials (i) and (ii), onto the surface to be coated, the mixture being in the form of a solution, dispersion or powder, and curing the mixture by heating to a temperature of 100° to 250° C.

2. Method as claimed in claim 1 wherein the wetting agent is a fatty amine, a fatty acid amide, a fatty acid alkanolamide, a condensated amine, a polyamine or a protein ampholyte.

3. Method as claimed in claim 1 wherein bisphenol A is used as the phenolic component and hexamethylenetetramine is used as the formaldehyde condensation product.

4. Method as claimed in claim 3 wherein the ratio of bisphenol A to hexamethylenetetramine is 4:1.

* * * * *